United States Patent
Poverennyy

(10) Patent No.: US 12,494,864 B2
(45) Date of Patent: Dec. 9, 2025

(54) ALIGNMENT MARKER ACQUISITION CIRCUITRY FOR A COMMUNICATION SYSTEM

(71) Applicant: Synopsys, Inc., Sunnyvale, CA (US)

(72) Inventor: Denis Georgievich Poverennyy, Aschheim (DE)

(73) Assignee: Synopsys, Inc., Sunnyvale, CA (US)

( * ) Notice: Subject to any disclaimer, the term of this patent is extended or adjusted under 35 U.S.C. 154(b) by 25 days.

(21) Appl. No.: 18/420,410

(22) Filed: Jan. 23, 2024

(65) Prior Publication Data

US 2025/0240119 A1 Jul. 24, 2025

(51) Int. Cl.
*H04L 1/00* (2006.01)
*H04L 69/14* (2022.01)

(52) U.S. Cl.
CPC .......... *H04L 1/0045* (2013.01); *H04L 1/0057* (2013.01); *H04L 69/14* (2013.01)

(58) Field of Classification Search
CPC ... H04L 1/0045; H04L 1/0057; H04L 1/0061; H04L 69/14; H04L 25/14
See application file for complete search history.

(56) References Cited

U.S. PATENT DOCUMENTS

| | | | |
|---|---|---|---|
| 8,307,265 B2 * | 11/2012 | Ganga | H04L 1/0052 370/510 |
| 10,644,834 B1 * | 5/2020 | McClellan | H03M 13/6306 |
| 2012/0044951 A1 * | 2/2012 | Han | H04L 69/323 370/419 |
| 2017/0257327 A1 | 9/2017 | Krakirian et al. | |
| 2018/0184373 A1 | 6/2018 | Caggioni et al. | |

OTHER PUBLICATIONS

"IEEE Standard for Information technology—Local and metropolitan area networks—Specific requirements—Part 3: CSMA/CD Access Method and Physical Layer Specifications Amendment 4: Media Access Control Parameters, Physical Layers, and Management Parameters for 40 Gb/s and 100 Gb/s Operation", IEEE Standard, IEEE, Piscataway, NJ, USA, Jun. 22, 2010 (Jun. 22, 2010), pp. 1-457, XP068055699.
International Search Report and Written Opinion, International Application No. PCT/US2024/055900, dated Feb. 14, 2025.

* cited by examiner

*Primary Examiner* — Shelly A Chase
(74) *Attorney, Agent, or Firm* — Patterson + Sheridan, LLP

(57) ABSTRACT

Systems and methods for reducing a number of comparators used during an alignment marker (AM) search are presented. A method includes enabling communication between a physical coding sublayer (PCS) having a PCS transmit side and a PCS receive side with a physical medium attachment (PMA) sublayer, at a first end, using multiple PCS lanes that receives data blocks from the multiple PCS lanes, wherein a PCS lane includes an alignment marker (AM) on the PCS transmit side and performs an AM search using a first AM search stage circuit, wherein, in the first AM search stage circuit, all of the multiple PCS lanes are consecutively searched with read components on the PCS receive side until an AM is detected in all of the multiple PCS lanes.

20 Claims, 11 Drawing Sheets

ALIGNMENT MARKER ACQUISITION CIRCUITRY FOR A COMMUNICATION SYSTEM

TECHNICAL FIELD

The present disclosure generally relates to network operations. More specifically, the present disclosure relates to finding an alignment marker in a block stream.

BACKGROUND

Advances in data center technology and Internet usage have pushed enterprise data centers from Gigabit Ethernet links to 10 Gigabit Ethernet (GbE) links and search engines or carriers or Internet service providers (ISPs) from single 10 GbE links to multiple links.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
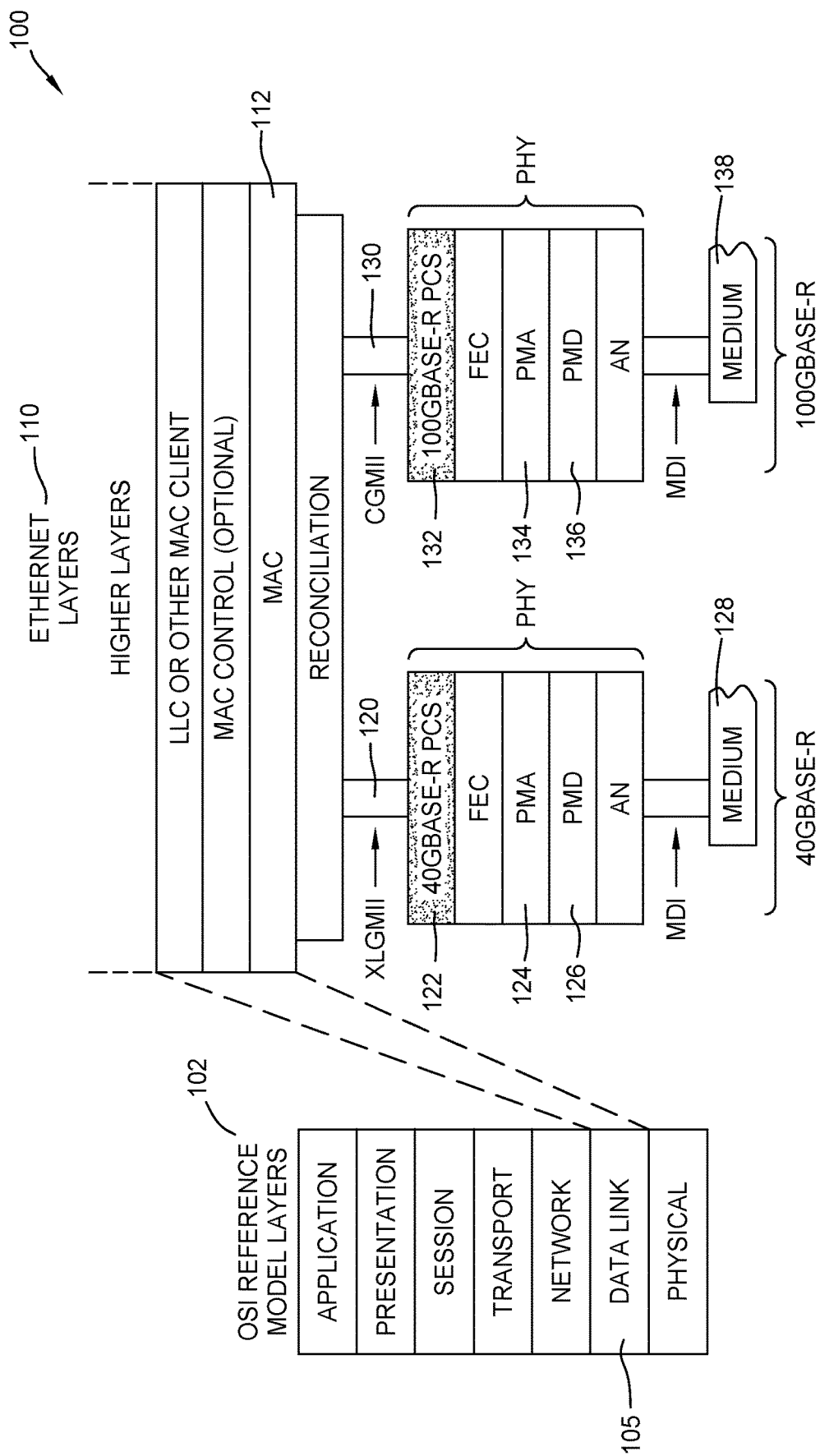
FIG. 1 illustrates an example relationship between the 40GBASE-R and 100GBASE-R physical coding sublayer (PCS) with other sublayers of the ISO open system interconnection (OSI) reference model.

Aspects of the present disclosure relate to align marker acquisition for a communication system. The IEEE 802.3ba task force has been established with the objective of standardizing 100 Gigabit Ethernet (GbE) and 40 GbE over the Internet and within data centers. If higher-speed Ethernet is to be useful in the near term, implementations must take advantage of existing copper and fiber cables, both in the data centers and over the Internet.

802.3, or IEEE 802.3, is a working group of standard specifications for the Ethernet, establishing a method of packet-based physical communication in a local area network (LAN) maintained by the Institute of Electrical and Electronics Engineers (IEEE). IEEE 802.3 defines a physical layer and a data link layer for media access control (MAC), or MAC address, for a wired, fast Ethernet network connection. These physical connections are made between nodes or devices such as routers, switches, and hubs via copper or fiber cables. In general, IEEE 802.3 standards specify the physical media and the working characteristics of the Ethernet.

The physical coding sublayer (PCS) is a networking protocol sublayer in the 40/100 Gigabit Ethernet standards. PCS resides at the top of the physical layer (PHY) and provides an interface between the physical medium attachment (PMA) sublayer and the media-independent interface (MII). PCS is responsible for data encoding and decoding, scrambling and descrambling, alignment marker insertion and removal, block redistribution, lane block synchronization, and deskew.

40 GbE and 100 GbE are groups of computer networking technologies for transmitting Ethernet frames at rates of 40 and 100 gigabits per second (Gbit/s), respectively. These technologies offer significantly higher speeds than 10 Gigabit Ethernet. The technology was first defined by the IEEE 802.3ba-2010 standard and later by the 802.3bg-2011, 802.3bj-2014, 802.3bm-2015, and 802.3cd-2018 standards. The standards define numerous port types with different optical and electrical interfaces and different numbers of optical fiber strands per port.

40GBASE-R and 100GBASE-R use 64b/66b encoding over multiple lanes. The 40GBASE-R PCS has a nominal rate at the PMA/FEC service interface of 10.3125 Gtransfers/s per PCS lane, which provides capacity for the MAC data rate of 40 Gb/s. The 100GBASE-R PCS has a nominal rate at the PMA/FEC service interface of 5.15625 Gtransfers/s per PCS lane, which provides capacity for the MAC data rate of 100 Gb/s.

The 40 GbE standard is designed for use between servers and the Ethernet switch within an organization. The 100 GbE standard is ideal for long-distance, switch-to-switch transmission. The 100 GbE standard is also ideal in mainstream data centers with high-bandwidth and low-latency requirements. This is especially true for data centers with greater virtualization and pooled virtual machines (VMs) and containers.

100 GbE is also suitable for the following operations, that is, switching, routing and aggregation in data centers, Internet exchange points, service provider peering points, high-bandwidth applications, like video on demand, and high-performance computing or cloud infrastructure. 100 GbE offers significant advantages, such as higher data transfer rates that enable faster access to files within an enterprise network. As Internet traffic increases and data centers host numerous virtual servers and devices, data centers need to process increasingly complex requests and update information in real time. All of this requires higher data speeds.

In view thereof, to further support 40 GbE and 100 GbE, the present embodiments present alignment marker (AM) circuitry for the PCS. The PCS is used for 64/66 bit, 40GBASE-R and 100GBASE-R, as defined in Clause 82 of IEEE 802.3.

In one embodiment, the AM circuitry may find an AM in a block stream by using a reduced number of comparators for both the 40 GbE and 100 GbE implementations. Less comparators are used by implementing a two-stage AM search process. In the first AM search stage, an initial AM search is performed for all PCS lanes on the read side of the PCS by reading buffer data consecutively and comparing the buffer data against all possible AMs. As soon as an AM for a particular PCS lane is found, the first stage of the AM searching for this lane on the read side of the PCS ends. In the second AM search stage, the found or determined AM value is sent to the AM state machine (SM) on the write side. The AM SM will then search for the found or determined AM from the read side. The AM SM will lock with the found or determined AM, and send data to the deskew buffer, or will signal back to the read side that the lock is not possible and a new AM search can be triggered. The present system and method advantageously allows for the decrease in the number of comparators for the 100G mode from 400 comparators to 40 comparators and for the decrease in the number of comparators for the 40G mode from 16 comparators to 8 comparators, thus reducing layout area usage and wire congestion.

FIG. 1 illustrates an example relationship 100 between the 40GBASE-R and 100GBASE-R physical coding sublayer (PCS) with other sublayers of the international organization for standardization (ISO) open system interconnection (OSI) reference model.

The OSI reference model describes seven layers that a computer system uses to communicate over a network. The OSI reference model layers 102 include an application layer, a presentation layer, a session layer, a transport layer, a network layer, a data link layer 105, and a physical layer. The data link layer 105 defines the format of the data on the network. The data link layer 105 includes two main parts, that is, the logical link control (LLC) and the media access control (MAC) 112, which uses MAC addresses to identify and connect devices and define permissions to transmit and receive data. The LLC and MAC 112 are part of the Ethernet layers 110.

The MAC 112 communicates with a 40GBASE-R PCS layer 122 and with a 100GBASE-R PCS layer 132. The MAC 112 communicates with the 40GBASE-R PCS layer 122 via interface XLGMII 120 (40 Gb/s media independent interface) and communicates with the 100GBASE-R PCS layer 132 via interface CGMII 130 (100 Gb/s media independent interface).

The 40GBASE-R PCS layer 122 includes several sublayers including the physical medium attachment (PMA) layer 124 and the physical medium dependent (PMD) layer 126. The 100GBASE-R PCS layer 132 also includes several sublayers including the PMA layer 134 and the PMD layer 136. The 40GBASE-R PCS layer 122 is coupled to a medium 128 via a first medium dependent interface (MDI). The 100GBASE-R PCS layer 132 is coupled to a medium 138 via a second medium dependent interface (MDI).

The PMA layer 124, 134 provides medium independent means for the PCS layer 122, 132 to support the use of range of different physical mediums. The 40GBASE-R PMA layer performs the mapping of transmit and receive data streams between the PCS layer 122, 132 and PMA layer 124, 134 via a PMA service interface. The PMA layer 124, 134 also performs mapping and multiplexing of transmit and receive data streams between the PMA layer 124, 134 and the PMD layer 126, 136 via the PMD service interface. The PMA layer 124, 134 also performs re-timing of the received data stream when appropriate. The PMA layer 124, 134 provides data loopback at the PMA or PMD service interface as well as test pattern generation.

The PMD layer 126, 136 is responsible for interfacing to the transmission medium. The PMD layer 126, 136 is located just above the medium dependent interface (MDI).

As noted, the PCS is a networking protocol sublayer in the 40/100 Gigabit Ethernet standards. PCS resides at the top of the physical layer (PHY), and provides an interface between the PMA layer 124, 134 and the media-independent interface (MII), e.g., the XLGMII 120 for the 40GBASE-R PCS layer 122 and the CGMII 130 for the 100GBASE-R PCS layer 132. PCS is responsible for data encoding and decoding, scrambling and descrambling, alignment marker insertion and removal, block redistribution, lane block synchronization, and deskew.

Figure 2:
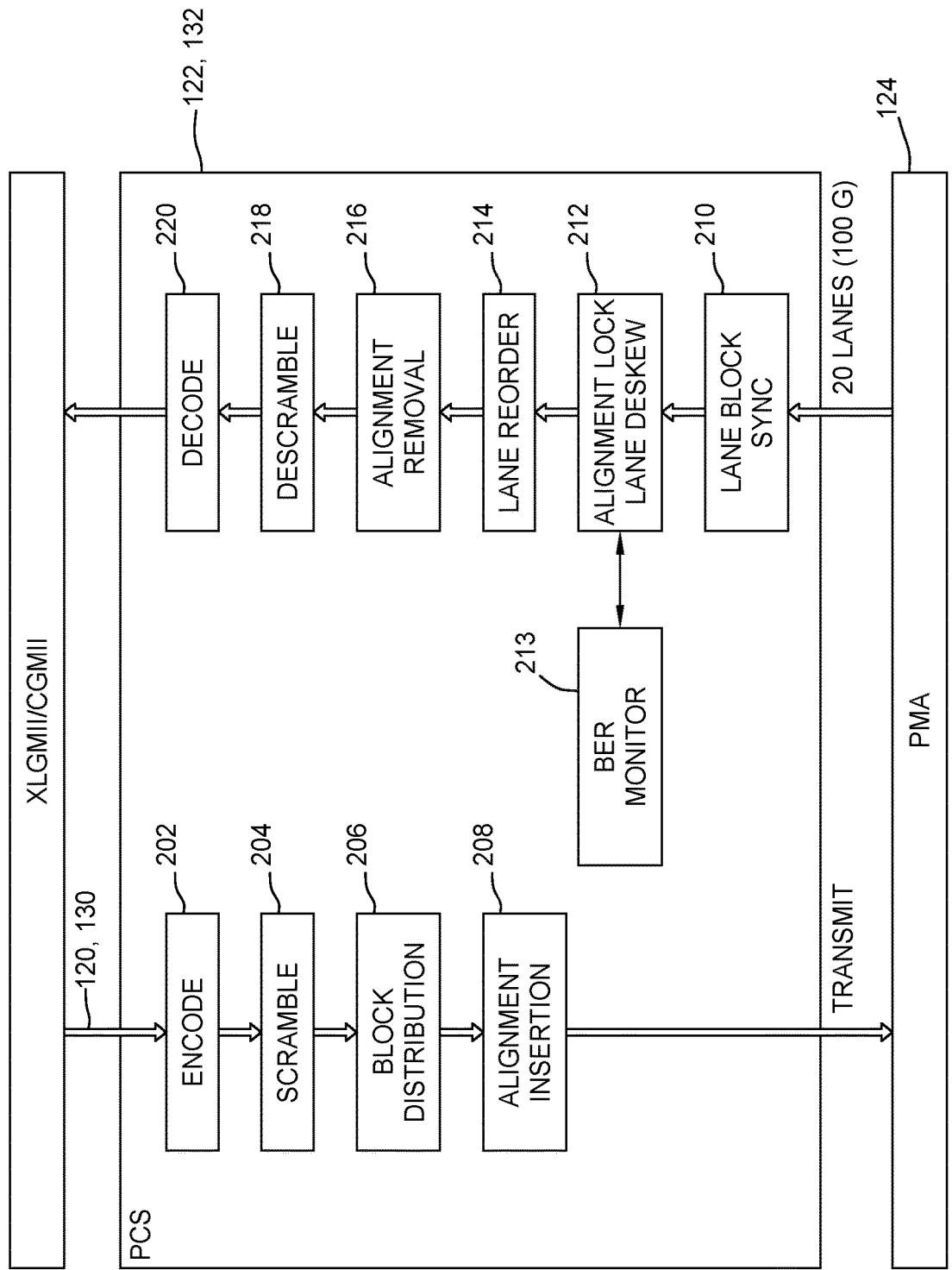
FIG. 2 illustrates an example of the PCS functionality.

FIG. 2 illustrates an example of the PCS functionality 200.

The PCS 122, 132 executes several functionalities, including encoding 202, scrambling 204, block distribution 206, and alignment insertion 208. The encoding 202, scrambling 204, block distribution 206, and alignment insertion 208 relate to the transmit side of the PCS 122, 132.

The PCS 122, 132 further executes functionalities including lane block synchronization 210, alignment lock lane deskew 212 that is coupled to a bit error rate (BER) monitor 213, lane reordering 214, alignment removal 216, descrambling 218, and decoding 220. The lane block synchronization 210, alignment lock lane deskew 212 that is coupled to BER monitor 213, lane reordering 214, alignment removal 216, descrambling 218, and decoding 220 relate to the receive side of the PCS 122, 132.

The PCS service interface is the media independent interface (XLGMII 120/CGMII 130), which is defined in Clause 81 of IEEE 802.3. The 40 Gb/s variant of this is called the 40 Gb/s media independent interface (XLGMII 120) and the 100 Gb/s variant of this interface is called the 100 Gb/s media independent interface (CGMII 130). The XLGMII 120/CGMII 130 provide a uniform interface to the reconciliation sublayer (FIG. 1) for all 40 Gb/s and 100 Gb/s PHY implementations.

As defined in Clause 82 of IEEE 802.3, when communicating with the XLGMII 120/CGMII 130, the PCS 122, 132 uses an eight octet-wide, synchronous data path, with packet delimiting being provided by transmit control signals (TXC<n>=1) and receive control signals (RXC<n>=1). When communicating with the PMA layer 124, the PCS 122, 132 uses multiple serial streams, that is, 4 encoded bit streams for a 40GBASE-R PCS, or 20 encoded bit streams for a 100GBASE-R PCS.

The PCS 122, 132 communicates with the XLGMII 120/CGMII 130 through a single data lane and communicates with the PMA layer 124, 134 either over 20 lanes (for the 100G mode) or over 4 lanes (for the 40G mode). The PCS 122, 132 provides the functions used to map packets between the XLGMII/CGMII format and the PMA/FEC service interface format.

The PCS 122, 132 performs the following functions, that is, delineation of frames, transport of control signals, ensures appropriate clock transition density used by the physical optical and electrical technology, optionally performs strong forward error correction (FEC) to control errors in a high BER environment, and strips and re-assembles the information across multiple lanes. The example embodiments includes the alignment marker (AM) features of the PCS 122, 132.

Figure 3:
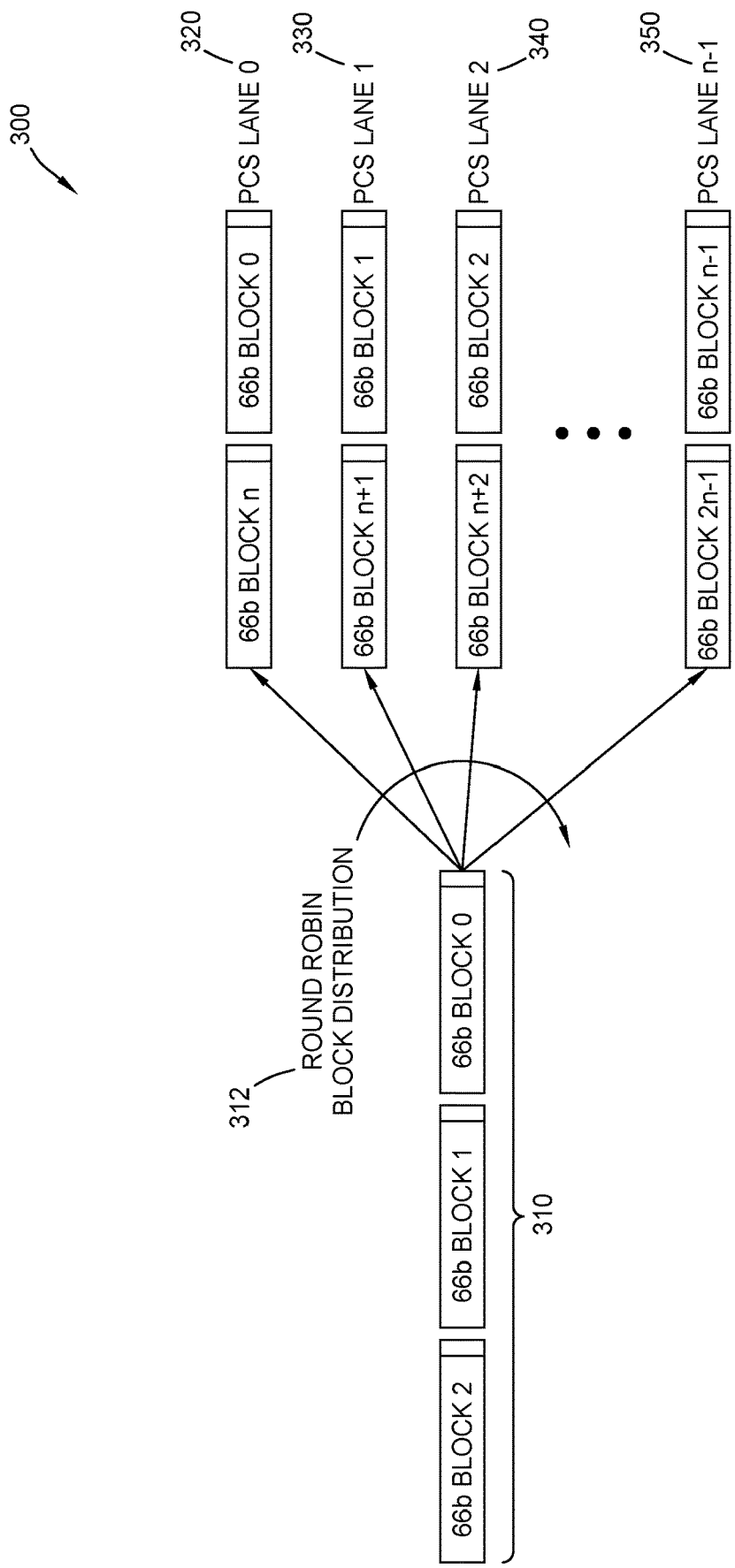
FIG. 3 illustrates an example of a block distribution from a single data stream into multiple lanes in the transmit functionality of the PCS.

FIG. 3 illustrates an example of a block distribution from a single data stream into multiple lanes in the transmit functionality 300 of the PCS.

The transmit PCS performs the following functions in order, that is, performs the initial 64B/66B encoding (e.g., at 202), scrambles the stream with a $X^{58}$ scrambler (e.g., at 204), distributes the scrambled blocks either over 20 lanes (for the 100G mode) or over 4 lanes (for the 40G mode) in Reed Solomon fashion (e.g., at 206), and adds alignment markers periodically per lane (e.g., at 208).

For 40 GbE, 4 PCS lanes support interface widths of 1, 2 and 4 channels or wavelengths. Once the PCS lanes are created, the PCS lanes can be multiplexed into any of the supportable interface widths. In order to support deskew and reordering of individual PCS lanes at the receive PCS, alignment markers (AMs) 402, 404, 406, 408 (FIG. 4) are added periodically to each PCS lane. All multiplexing is done at the bit-level. AMs 402, 404, 406, 408 carry specific content for 40 GbE, as well as 100 GbE.

The round-robin bit-level multiplexing can result in multiple PCS lanes being multiplexed into the same physical channel. A property of the PCS lanes is that no matter how they are multiplexed together, all bits from the same PCS lane follow the same physical path, regardless of the width of the physical interface. This enables the receiver to be able to correctly re-assemble the aggregate channel by first de-multiplexing the bits to re-assemble the PCS lanes and then re-align the PCS lanes and compensate up to the maximum allowed skew.

Referring back to FIGS. 2 and 3, the PCS encoding 202 encodes 64-bit blocks into 66 bit blocks 310. The 66-bit block 310 is a basis for data processing both for transmit and receive PCS sides. The 66-bit blocks 310 are built such that they have two special extra bits (synch headers) that allow the process to find a block boundary in the data stream.

Scrambling 204 is performed on the block data to generate pseudo random sequences. However, the sync headers bypass the scrambling 204. Based on the sync headers, the receiver can determine block boundaries (lane block synchronizing 210) and restore original data through descrambling 218.

The single data stream is then distributed over 20 (for 100G mode) or 4 (for 40G mode) lanes in, e.g., round robin fashion 312 (e.g., first, block 0 goes in lane 0, second, block 1 in lane 1, . . . nineteenth block in lane 19 and then again block 0 in lane 0, block 1 in lane 1 and so on). Eventually data for each PCS lane 320, 330, 340, 350 can be transferred independently from each other. Even if the PCS lanes 320, 330, 340, 350 are transferred through the same physical medium, each PCS lane can eventually have different delays. Also, the PCS lanes from the transmit side can be connected in any arbitrary orders to PCS lanes on the receive side. To recreate a single data stream on the receive side, blocks referred to as align markers or alignment markers (AMs) are periodically added in each PCS lane 320, 330, 340, 350 on the transmit side, as described below with reference to FIG. 4.

Figure 4A:
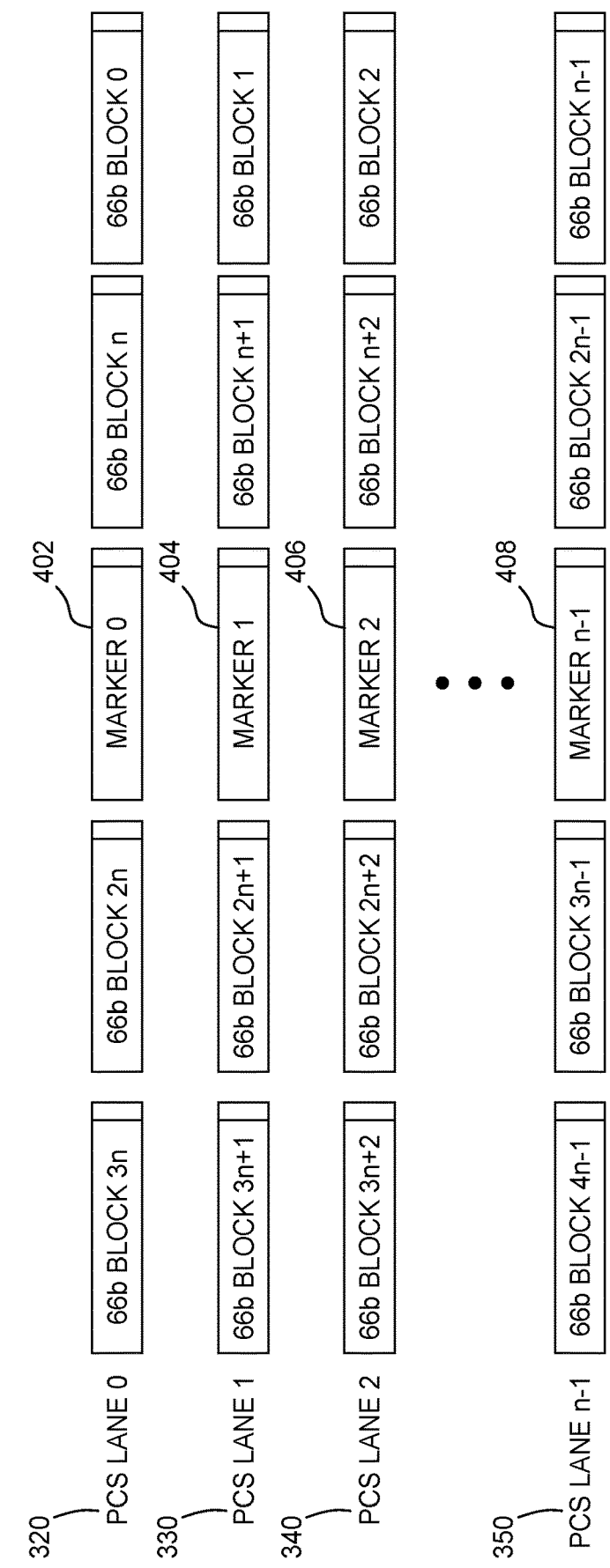
FIG. 4A illustrates the standard's requirements for AM insertion in the PCS transmit lanes.

FIG. 4A illustrates the standard's requirements for AM insertion 400 in the PCS transmit lanes 320, 330, 340, 350.

In order to support deskew (i.e., remove skew between PCS lanes due to different delays in the PCS lanes) and reordering of individual PCS lanes at the receive PCS, AMs 402, 404, 406, 408 are added periodically and at the same time to each PCS transmit lane 320, 330, 340, 350. The AMs 402, 404, 406, 408 take the form of a specially defined 66-bit block that can be detected on the receive side of the PCS.

Figure 4B:
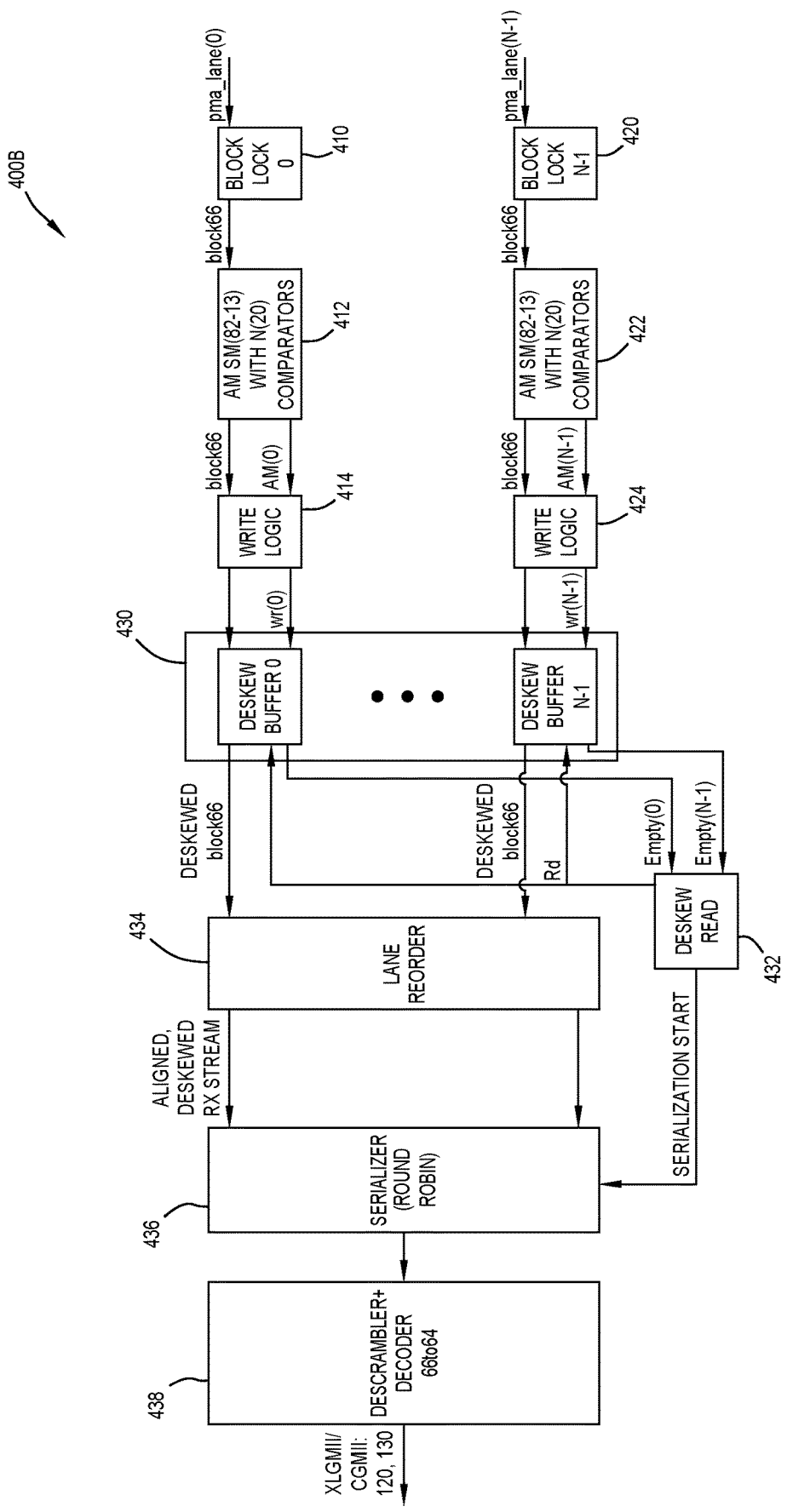
FIG. 4B illustrates the receive functionality of the PCS.

FIG. 4B illustrates the receive functionality of the PCS.

Regarding the PCS receive side, first, the 66-bit block boundaries are found in each lane. A block lock module 410, 420 finds the block boundaries and creates a sequence of 66-bit blocks at its output. Then an AM 412, 422 is found in the 66-bit stream. An alignment marker state machine (AM SM) is instantiated in each PCS lane. The AM SM is tasked to determine one out of 20 (for 100G mode) or 4 (for 40G mode) possible AMs and then continuously monitor incoming AMs. If AMs are not consistent, the AM SM will automatically transition into an initial state and restart the AM search process. A write logic 414, 424 takes place after the AM SM starts writing into the deskew buffers 430 at the AM 66-bit block. The deskew buffers 430 are a set of identical buffers that are separately written by the write logic 414, 424 per each PCS lane. However, these buffers are always read at the same time (block 432) when all buffers are not empty. This way, a possible skew between PCS lanes may be discovered. The 66-bit block data from the deskew buffers 430 are simultaneously received into a lane reorder block 434 to perform lane reordering. The blocks are reordered based on the AMs detected per each PCS lane. Also, at this stage, the AMs are removed from the 66-bit block data by performing alignment removal 216. The serializer 436 redirects one PCS lane at a time to perform descrambling 218 and decoding 220 with descrambler and decoder 438. After the block is descrambled and decoded, 64-bit data are sent to the XLGMII/CGMII 120, 130.

Figure 5:
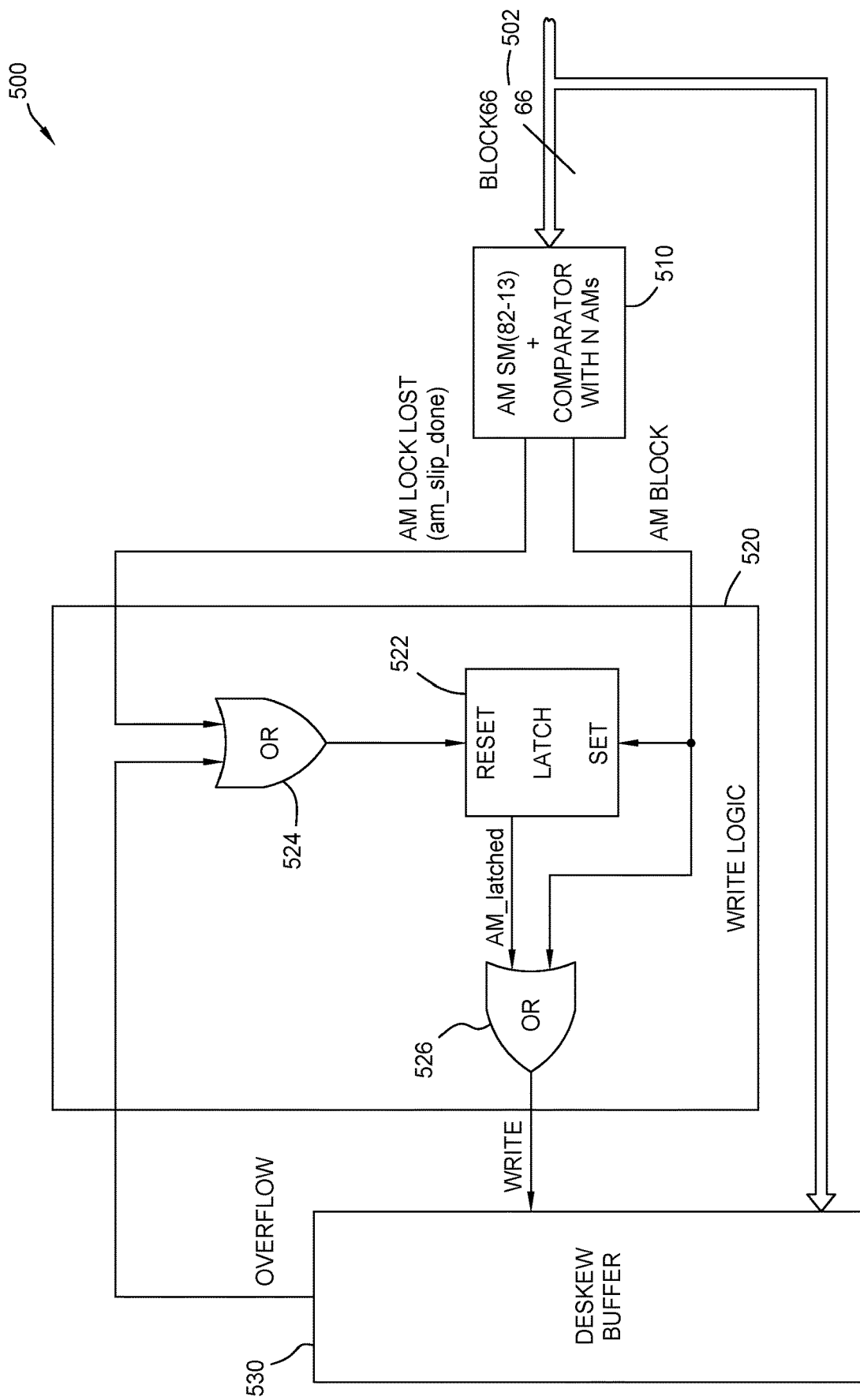
FIG. 5 illustrates an example interaction between the AM state machine (AM SM), write logic, and a deskew buffer.

FIG. 5 illustrates an example interaction 500 between the AM SM, write logic, and a deskew buffer.

Each receive lane includes the write logic 520 that is placed between the AM SM 510 and the deskew buffer 530. This write logic 520 is activated by the AM SM 510. When the AM SM 510 locks the AM, the AM SM 510 marks the AM block 502 in the data stream to the write logic 520. The write logic 520 starts writing into the deskew buffer 530 only if the AM is signaled. As such, the very first block that is written into the deskew buffer 530 is an AM. This guarantees that data in all deskew buffers 530 are aligned with respect to each other.

It is noted that the AM search is performed in parallel in all PCS lanes (e.g., 20 lanes in the case of 100G mode). However, the AM search can be completed at different times, which may cause some of the deskew buffers 530 to be written much earlier than others. In one case, the buffer may overflow (e.g., the buffers are simultaneously or concurrently read when all of them are not empty but written independently of each other). In this case, the corresponding buffer and the write logic 520 can be reset at reset block 522 via gate logic 524, 526. A next write into the deskew buffer 530 will take place with the new AM signaled by the AM SM 510.

After the AM lock, the AM SM 510 continues monitoring the incoming traffic and if the current AM cannot be found after four consecutive attempts, the AM SM 510 declares an AM Lock Lost (am_slip_done pulse is generated), and restarts the AM searching process. In this case, both the deskew buffer 530 and the write logic 520 for this PCS lane will be reset.

The AM SM 510 is instantiated per PCS lane, and is responsible for detecting an AM for this PCS lane and then checking whether the same AM is continuously received. Otherwise, the AM detection process will be restarted.

The features of the AM SM 510 are described as follows:

In a first step, the AM SM 510 compares receiving blocks against all AM values (e.g., 20 AM values in the 100G mode). The AM SM 510 waits until a match occurs between any AM value out of a possible 20 AMs and a received block.

In a second step, the AM SM 510 checks that the AM found above, is found again in an expected time position (e.g., AMs are periodically inserted within an AM period). If the same AM is found again, an AM lock (am_lock) is declared, and input blocks are directed into the deskew buffer 530. The AM SM 510 continues monitoring the input data. If the second AM is not found as expected, the AM SM 510 generates am_slip_done and returns to the step above to start searching for AMs again.

In general, an AM lock identifies the PCS lane number received on a particular lane of the service interface. Once the block synchronization function achieves block lock on a PCS lane, it begins obtaining the AM lock. The AM lock identifies the PCS lane number received on a particular lane of the service interface. After AM lock is achieved on all lanes (e.g., 20 lanes for 100G mode), all inter-lane skew is removed.

The AM SM 510 then checks whether the detected AMs periodically continue to arrive. If after four consecutive attempts AMs are not detected, the AM SM 510 generates am_slip_done and returns to the first step above to start searching for AMs again.

Figures 6A, 6B:
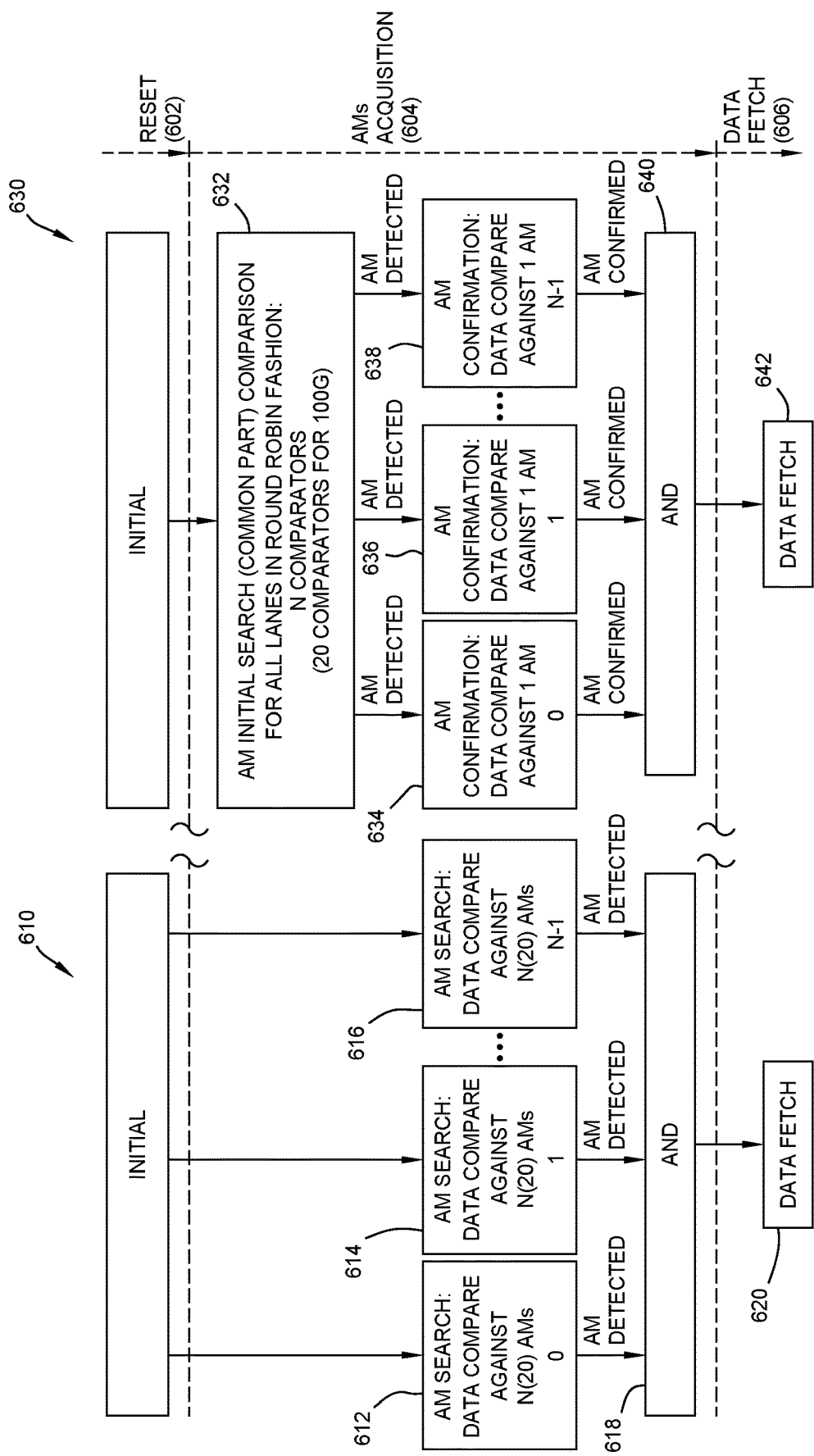
FIG. 6A illustrates an example implementation for AM acquisition and data fetch.
FIG. 6B illustrates another example implementation for AM acquisition and data fetch using a reduced number of comparators.

FIG. 6A illustrates an example implementation for AM acquisition and data fetch.

One challenging task in the receive process is finding an AM in the block stream. The problem is that to find a unique AM per PCS lane, each incoming block must be compared against 20 (for 100G mode) or 4 (for 40G mode) AMs (first step in the AM SM 510). Thus, for the 100G mode, the AM SM 510 uses 400 comparators [20 (comparators per lane)× 20 (lanes)]. For the 40G mode, the AM SM 510 uses 16 comparators [4 (comparators per lane)×4 (lanes)]. Each comparator is 48 bit wide. As seen for the 100G mode, this number of comparators results in significant area usage and wire congestion that can be a challenge for the place and route phase.

In implementation 610, there are three phases, that is, a reset phase 602, an AM acquisition phase 604, and a data fetch phase 606. Initialization occurs in the reset phase 602. The AM acquisition process is performed in parallel in all lanes. The AM acquisition includes two steps, that is, AM search and AM confirmation. In the first step, an AM is searched by comparing an incoming block against all AMs (612, 614, 616). As soon as an AM is found, the same AM is expected to be found after a certain interval (i.e., AM period). If the match occurs, the AM acquisition per particular lane is achieved (618). If no match occurs, the AM SM starts searching for the first AM again. When AM acquisition is performed for all lanes, the data can be fetched (620) from the deskew buffer (i.e., at the data fetch stage).

FIG. 6B illustrates another example implementation for AM acquisition and data fetch using a reduced number of comparators.

Although the description below applies to the 100G mode, it is appreciated that the present disclosure may apply to other modes without deviating from the present disclosure. The deskew buffers accumulate data for 20 lanes (100G mode). However, the CGMII 130 has only one lane. In other words, that data from the 20 deskew buffers cannot be read more often than once in 20 clocks. Basically, it is the same as read only one buffer per clock in sequence.

The number of comparators can be reduced by dividing the AM search into two stages or a two-stage approach. An initial AM search for all lanes is performed on the read side by consecutively reading buffer data for each lane and comparing the buffer data against all possible AMs (N=20 for 100G mode). As such, the first read and comparison is performed for buffer data of lane 0, the next read and comparison is performed for buffer data of lane 1 and so on. In other words, in one 20 clock round, up to 20 lane buffers are read. If data is not available for a particular lane (i.e., the buffer is empty), the read (RD) SM will read the next buffer. As soon as an AM for a particular lane is found, the AM searching on the read side is stopped, and the found AM value is sent to the AM SM on the write side. In the next AM search stage for this lane, the AM SM 510 will search for the only AM provided from the read side. Thus, there is no need to implement 20 comparators per lane (e.g., in the 100G mode). The AM SM 510 will lock with the provided AM and send data in the deskew buffer 530 or will signal back to the read side that the lock is not possible and the search for a new AM will be started.

In implementation 630, there are three phases, that is, a reset phase 602, an AM acquisition phase 604, and a data fetch phase 606. Initialization occurs in the reset phase 602. The AM acquisition phase 604 includes two stages. In a first stage, an initial AM search 632 takes place. The initial AM search 632 occurs for all lanes, e.g., all 20 lanes when the 100G mode is implemented. The comparison is made for each data buffer by sequential reading all buffers, e.g., in a round robin approach. When an AM is found in any of the 20 lanes when the 100G mode is implemented, the initial AM search 632 on the read side is stopped for this lane. In the second AM search stage (634, 636, 638), the AM value is sent to the AM SM 510 on the write side. Then the AM SM 510 on the write side is activated and a search is started for the provided AM in the coming blocks. The AM SM 510 either acquires the AM in the incoming lane stream or signals back to the read side that AM acquisition is not possible and a new search for the AM must be re-started on the read side. Once all AMs are acquired for all 20 lanes (signaled by the AND gate logic 640), the data can be fetched (642) from the deskew buffers.

Figure 7A:
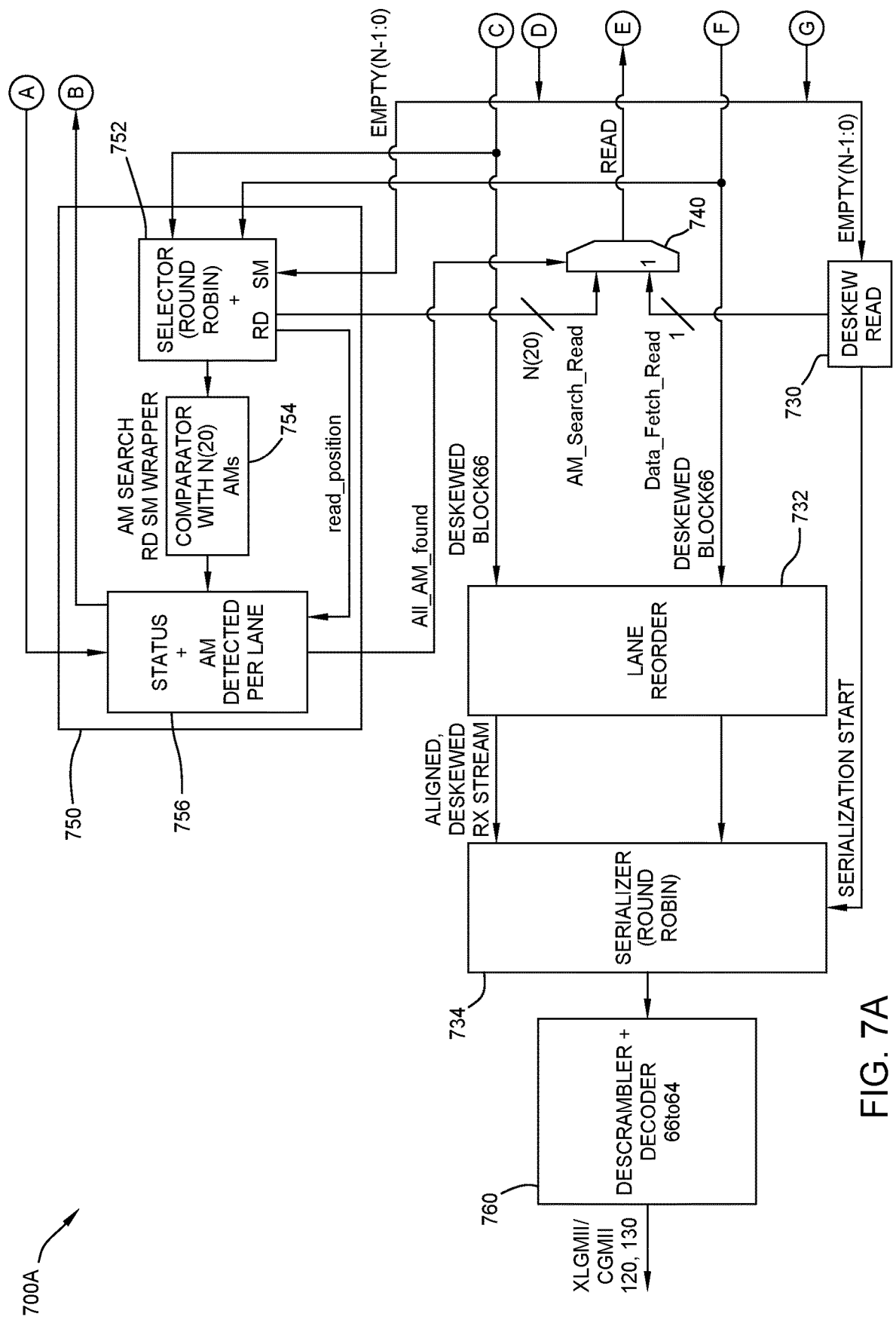
FIG. 7A-7B illustrate an example AM lock process circuit.
Figure 7B:
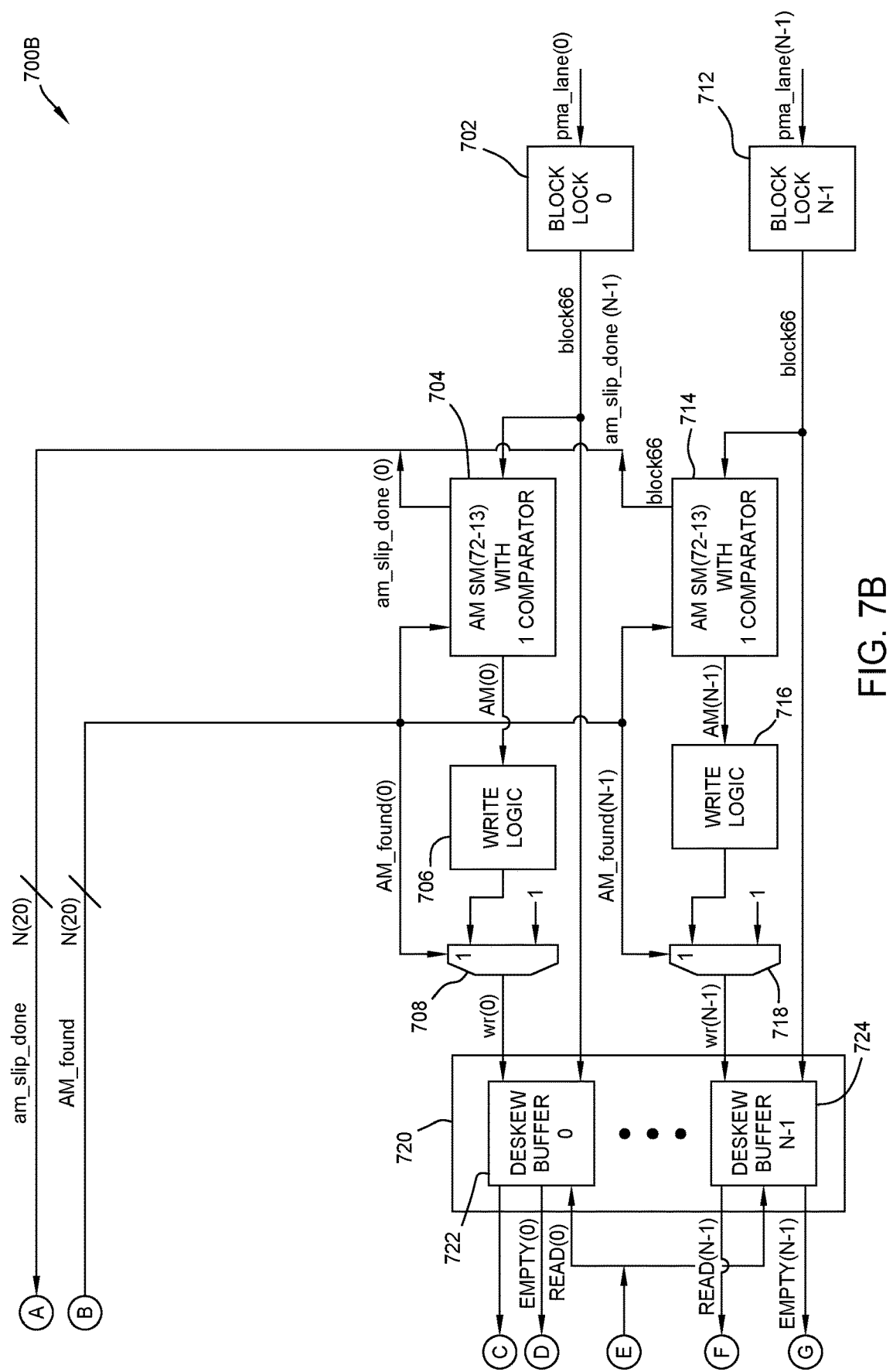

FIG. 7A-7B illustrate an example AM lock process circuit 700A, 700B.

Block Lock 0 (702) sends the 66 bit data blocks (block66) into the deskew buffer 0 (722). First write logic 706 controlled by the AM SM 704 is bypassed as the AM SM is not activated (AM_found(0) is not set yet). The multiplexer 708 then selects between a write enable from the first write logic 706 and an unconditional write (e.g., set to logic 1).

Block Lock N−1 (712) sends the 66 bit data blocks (block66) into the deskew buffer N−1 (724). Second write logic 716 controlled by the AM SM 714 is bypassed as the AM SM is not activated (AM_found(N−1) is not set yet). The multiplexer 718 then selects between a write enable from the second write logic 716 and an unconditional write (e.g., set to logic 1).

In FIG. 7B, there are N lanes (from lane 0 to N−1). Thus, first data blocks are written in parallel for all lanes as all AM SMs 704, 714 for all lanes are not active at the start. Then the AM search RD SM wrapper 750 consequently reads buffers in, e.g., a round robin order.

The multiplexers 708 . . . 718 make a selection based on the value for the corresponding AM_found(0 . . . N−1) between a write enable from the second write logic 716 and an unconditional write.

Then an AM search RD SM wrapper 750 is used to perform and complete the first AM search stage. The AM search RD SM wrapper 750 includes three components, that is, a selector with read SM 752 for performing a round robin block selection, a set of comparators (e.g., 20 comparators for 100G mode), and an AM status block 756.

The AM search RD SM wrapper 750 is used in the initial AM search phase. The AM search RD SM wrapper 750 reads one block at a time from the corresponding deskew buffer. The block is compared (754) against the AM values (e.g., 20 AM values). If a match occurs, the AM_found status from the AM status block 756 is set for this PCS lane in the status detector 756. The matched AM information is also latched in the AM status block 756. The AM status block 756 keeps track of the current status for all PCS lanes and based on it, the AM searching for a particular lane is either active or stopped. The AM search RD SM wrapper 750 only reads deskew buffers for lanes that do not have AM_found status set. Eventually the AM_found status is set for all PCS lanes (All_AM_found is set) and the AM search RD SM wrapper 750 stops reading the deskew buffers.

A multiplexer 740 is used to switch between two read SMs. At the AM acquisition stage, the AM search RD SM wrapper 750 is active. When AMs are found for all lanes (AM_found status is set for all PCS lanes), the multiplexer 740 is switched to a deskew read SM. Then the block data from the deskew buffers 720 are sent to the lane reordering block 732. The lane reordering block 732 reorders the blocks based on the detected AMs. The serializer 734 redirects one lane at a time to the descrambler and decoder block 760.

In operation, in a first stage of an AM search, after initialization of the 66-bit data blocks from the lane block synchronization 210, the 66-bit data blocks are directly written into corresponding deskew buffers 720. The AM SM 510 is under reset. The AM search RD SM wrapper 750, in, e.g., round robin fashion, reads data from the deskew buffers 720 and compares each read data block against N (e.g., 20 in the 100G mode) AM patterns. Alternatives to round robin scheduling may include first-come-first-served (FCFS) scheduling, priority scheduling, shortest job first (SJF) scheduling, or a combination thereof. If the read data block matches any AM, the AM_found bit is set for this PCS lane and the matched AM number is latched or stored. The AM search RD SM wrapper 750 stops reading this PCS lane buffer.

In operation, in a second stage of the AM search, the AM SM 510 for this lane is activated and finds the first state. Being in this state, a comparison between the AM found in the first stage (read side) and incoming data is performed. If no match within an AM period is determined, the AM_found status for this channel is reset (am_slip_done pulse is generated) and the AM search for this PCS lane is restarted again. Otherwise, the AM SM 510 continues searching for the second AM, and if it is found, the AM_lock is declared, and the data stream will be written in the deskew buffer through the write logic. When reaching a SLIP state, that is, a second AM was not found, the am_slip_done is set to 1, which causes the AM search (read side) to start for this PCS lane again.

When AMs for all the lanes are found (All_AM_found=1), the RD SM is switched to a data fetch state. In this state, the SM simultaneously reads all buffers to create a single de-skewed data stream.

Therefore, changes of an AM_found(x) status will reset the corresponding deskew buffer and the write logic. The buffer overflow will reset the deskew buffer itself and the corresponding write logic. This guarantees that the first read data is always aligned with the AM. The AM SM 510 constantly monitors received blocks and checks for AM consistency. If AMs are not detected after four consecutive attempts, the AM SM 510 will reach the SLIP state and am_slip_done pulse is generated. This will restart the AM searching for this PCS lane on the read side. The status bit (i.e., AM_found) per lane in the AM status block 756 is set when the comparators of the AM search RD SM wrapper 750 signals match. The status bit is reset by the am_slip_done pulse that is generated by the corresponding AM SM 510 if either the AM lock cannot be achieved or the AM lock is lost (i.e., the AM SM 510 reaches the SLIP state). After initialization, (i.e., system reset), the status bits (AM_found) are not set. Thus, the AM search will be started for all PCS lanes.

The AM lock process circuit 700A, 700B thus allows for the decrease in the number of comparators for the 100G mode from 400 comparators that are currently used down to 20×1+20=40 comparators, where the CGMII width is one of 64-bit block. For the 40G mode, the number of comparators is reduced from 16 that are currently used to 4+4=8 comparators, where the XLGMII width is one of 64-bit block.

Figure 8:
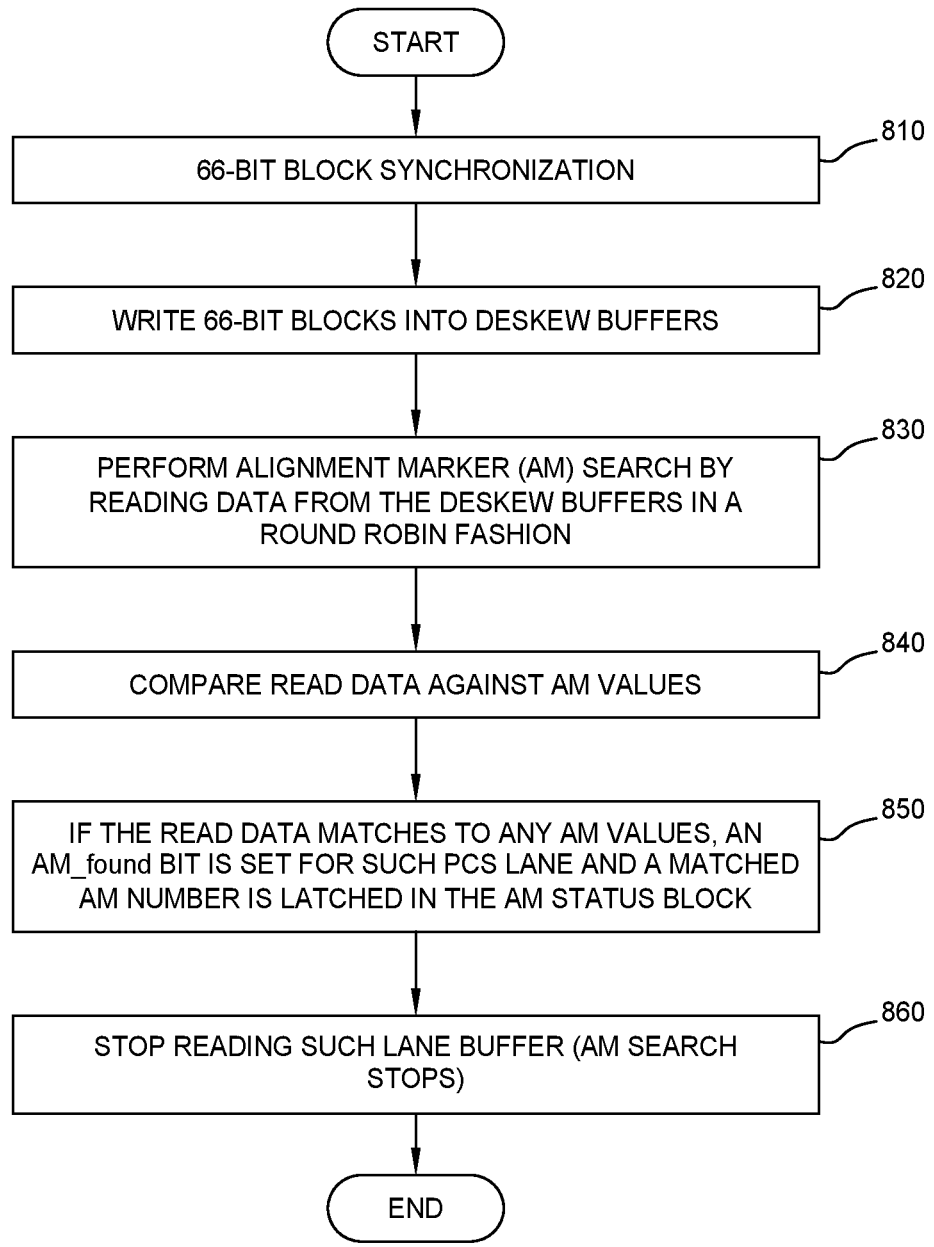
FIG. 8 is a flowchart for implementing an example AM lock process.

FIG. 8 is a flowchart for implementing an example AM lock process.

At 810, 66-bit block synchronization is performed. The 66-bit block is a basis for data processing both for transmit and receive sides of the PCS. The 66-bit blocks are built in such a way as to have two special extra bits (synch headers) that allow the method to find a block boundary in a data stream.

At 820, the 66-bit blocks are written into the deskew buffers.

At 830, an AM search is performed by reading data from the deskew buffers in round robin fashion.

At 840, the read data is compared against the AM values.

At 850, if the read data matches to any of the AM values, an AM_found bit is set for such PCS lane and a matched AM number is latched in the AM status block 856 of the AM search RD SM wrapper 850.

At 860, the process stops reading such lane buffer (i.e., the AM search stops).

One challenging task in the receive process is finding an AM in the block stream. The problem is that to find a unique AM per PCS lane, each incoming block is compared against 20 (for 100G mode) or 4 (for 40G mode) AMs. Thus, for the 100G mode, the AM SM uses 400 comparators [20 (comparators per lane)×20 (lanes)], whereas for the 40G mode, the AM SM uses 16 comparators [4 (comparators per lane)×4 (lanes)]. Each comparator is 48 bit wide. As seen for the 100G mode, this number of comparators results in significant area usage and wire congestion that can be a challenge for the place and route phase. To address such issue, the example embodiments achieve a bandwidth reduction by using less comparators. The number of comparators can be reduced by dividing the AM search into two stages (two-stage AM search). A first or initial AM search for all PCS lanes is performed on the read side by reading buffer data consecutively and comparing the buffer data against all N possible AMs. As soon as an AM for a particular PCS lane is found, the AM searching on the read side ends and the AM value is sent to the AM SM on the write side. The AM SM then will search for the determined AM from the read side. Thus, there is no need to implement a maximum number of comparators per lane (e.g., 400 comparators in the 100G mode). The AM SM will lock with the determined or found AM and send data in the deskew buffer or will signal back to the read side that the lock is not possible and a new AM search is triggered.

Figure 9:
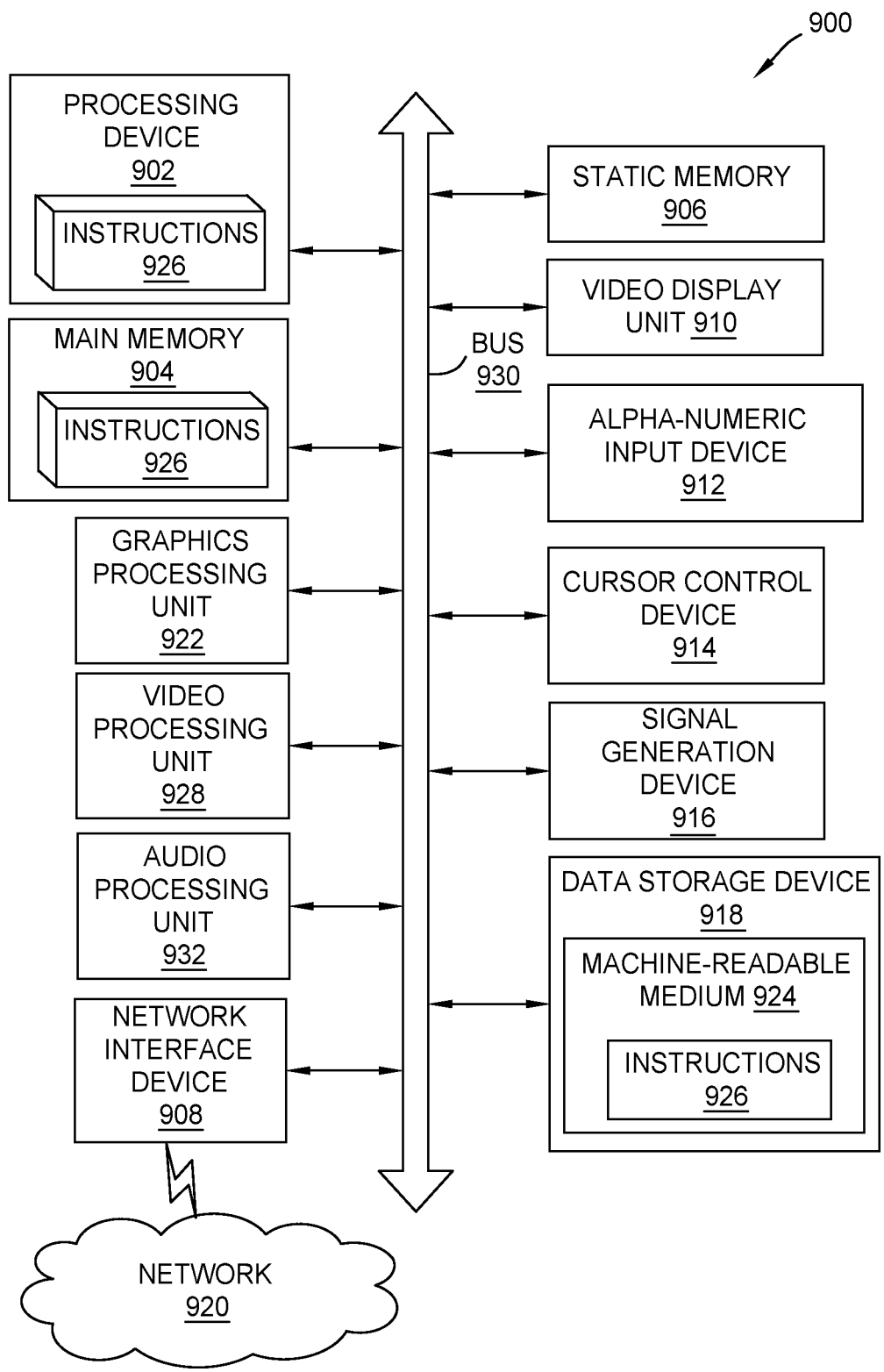
FIG. 9 illustrates an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

The present disclosure relates to reducing a number of comparators used during an alignment marker search performed in a physical coding sublayer (PCS). The PCS is used for 64/66 bit, 40GBASE-R and 100GBASE-R, as defined in Clause 82 of IEEE 802.3.

In one example, a network architecture includes a physical coding sublayer (PCS) having a PCS transmit side and a PCS receive side, the PCS communicating with a physical medium attachment (PMA) sublayer at a first end using multiple PCS lanes that receives data blocks from the multiple PCS lanes, wherein a PCS lane includes an alignment marker (AM) on the PCS transmit side and performs an AM search using a first AM search stage circuit, wherein, in the first AM search stage circuit, all of the multiple PCS lanes are consecutively searched with read components on the PCS receive side until an AM is detected in all of the multiple PCS lanes.

In another example, a method includes enabling communication between a physical coding sublayer (PCS) having a PCS transmit side and a PCS receive side with a physical medium attachment (PMA) sublayer, at a first end, using multiple PCS lanes that receives data blocks from the multiple PCS lanes, wherein a PCS lane includes an alignment marker (AM) on the PCS transmit side and performs an AM search using a first AM search stage circuit, wherein, in the first AM search stage circuit, all of the multiple PCS lanes are consecutively searched with read components on the PCS receive side until an AM is detected in all of the multiple PCS lanes.

In yet another example, a non-transitory computer readable medium having stored instructions, which when executed by a processor, cause the processor to enable communication between a physical coding sublayer (PCS) having a PCS transmit side and a PCS receive side with a physical medium attachment (PMA) sublayer, at a first end, using multiple PCS lanes that receives data blocks from the multiple PCS lanes, wherein a PCS lane includes an alignment marker (AM) on the PCS transmit side and performs an AM search using a first AM search stage circuit, wherein, in the first AM search stage circuit, all of the multiple PCS lanes are consecutively searched with read components on the PCS receive side until an AM is detected in all of the multiple PCS lanes.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementation of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A network architecture comprising:
a physical coding sublayer (PCS) having a PCS transmit side and a PCS receive side, the PCS communicating with a physical medium attachment (PMA) sublayer at a first end using multiple PCS lanes that:
receives data blocks from the multiple PCS lanes, wherein a PCS lane includes an alignment marker (AM) on the PCS transmit side; and
performs an AM search using a first AM search stage circuit, wherein, in the first AM search stage circuit, all of the multiple PCS lanes are consecutively searched with read components on the PCS receive side, and upon detection of an AM in a given PCS lane, the detected AM is transmitted to an AM state machine (AM SM).

2. The network architecture of claim 1, wherein the PCS communicates with a first media independent interface and a second media independent interface at a second end.

3. The network architecture of claim 2, wherein the first media independent interface supports 40 Gb/s data transmission and the second media independent interface supports 100 Gb/s data transmission.

4. The network architecture of claim 1, wherein the AM SM is coupled to write components on the PCS receive side.

5. The network architecture of claim 4, wherein the AM search further includes a second AM search stage circuit, wherein the AM SM searches for the detected AM provided by the read components on the PCS receive side.

6. The network architecture of claim 5, wherein, if the AM SM locks with the detected AM, the AM SM sends data to a deskew buffer.

7. The network architecture of claim 5, wherein if the AM SM is prevented from locking with the detected AM, the AM SM sends a signal back to the read components on the PCS receive side to trigger an additional AM search.

8. The network architecture of claim 1, wherein each of the multiple PCS lanes is coupled to a respective AM SM, which in turn is coupled to a respective write component, each write component coupled to a respective multiplexer followed by a respective deskew buffer.

9. The network architecture of claim 8, wherein an AM search read state machine (RD SM) wrapper component reads one data block at a time of a sequence of data blocks received from the respective deskew buffer.

10. The network architecture of claim 9, wherein the AM search RD SM wrapper component includes a RD SM to perform a round robin search, a set of comparators, and a status detector.

11. The network architecture of claim 10, wherein each data block of the sequence of data blocks is compared to stored AM values by the set of comparators.

12. The network architecture of claim 11, wherein, if a match is determined between an AM in the sequence of data blocks and the stored AM values, an AM found status is set and stored by the AM status block.

13. A method comprising:
enabling communication between a physical coding sublayer (PCS) having a PCS transmit side and a PCS receive side with a physical medium attachment (PMA) sublayer, at a first end, using multiple PCS lanes that:
receives data blocks from the multiple PCS lanes, wherein a PCS lane includes an alignment marker (AM) on the PCS transmit side; and
performs an AM search using a first AM search stage circuit, wherein, in the first AM search stage circuit, all of the multiple PCS lanes are consecutively searched with read components on the PCS receive side, and upon detection of an AM in a given PCS lane, the detected AM is transmitted to an AM state machine (AM SM).

14. The method of claim 13, wherein the AM SM is coupled to write components on the PCS receive side.

15. The method of claim 14, wherein the AM search further includes a second AM search stage circuit, wherein the AM SM searches for the detected AM provided by the read components on the PCS receive side.

16. The method of claim 15,
wherein, if the AM SM locks with the detected AM, the AM SM sends data to a deskew buffer; and wherein if the AM SM is prevented from locking with the detected AM, the AM SM sends a signal back to the read components on the PCS receive side to trigger an additional AM search.

17. The method of claim 13, wherein each of the multiple PCS lanes is coupled to a respective AM SM, which in turn is coupled to a respective write component, each write component coupled to a respective multiplexer followed by a respective deskew buffer.

18. The method of claim 17,
wherein an AM search read state machine (RD SM) wrapper component reads one data block at a time of a sequence of data blocks received from the respective deskew buffer; and
wherein the AM search RD SM wrapper component includes a RD SM for performing a round robin search, a set of comparators, and an AM status block.

19. The method of claim 18,
wherein each data block of the sequence of data blocks is compared to stored AM values by the set of comparators; and
wherein, if a match is determined between an AM in the sequence of data blocks and the stored AM values, an AM found status is set and stored by the AM status block.

20. A non-transitory computer readable medium comprising stored instructions, which when executed by a processor, cause the processor to:
enable communication between a physical coding sublayer (PCS) having a PCS transmit side and a PCS receive side with a physical medium attachment (PMA) sublayer, at a first end, using multiple PCS lanes that:
receives data blocks from the multiple PCS lanes, wherein a PCS lane includes an alignment marker (AM) on the PCS transmit side; and
performs an AM search using a first AM search stage circuit, wherein, in the first AM search stage circuit, all of the multiple PCS lanes are consecutively searched with read components on the PCS receive side, and upon detection of an AM in a given PCS lane, the detected AM is transmitted to an AM state machine (AM SM).

\* \* \* \* \*